(12) United States Patent
Shah

(10) Patent No.: US 6,533,945 B2
(45) Date of Patent: Mar. 18, 2003

(54) FISCHER-TROPSCH WASTEWATER UTILIZATION

(75) Inventor: Lalit S. Shah, Sugar Land, TX (US)

(73) Assignee: Texaco Inc., White Plains, NY (US)

( * ) Notice: Subject to any disclaimer, the term of this patent is extended or adjusted under 35 U.S.C. 154(b) by 34 days.

(21) Appl. No.: 09/813,616

(22) Filed: Mar. 21, 2001

(65) Prior Publication Data

US 2001/0045397 A1 Nov. 29, 2001

Related U.S. Application Data

(60) Provisional application No. 60/200,309, filed on Apr. 28, 2000.

(51) Int. Cl.$^7$ .................................................. C02F 1/00
(52) U.S. Cl. ...................... 210/765; 210/194; 210/805; 518/700; 518/705; 518/711
(58) Field of Search ................................ 210/194, 765; 210/805; 518/700, 705, 711

(56) References Cited

U.S. PATENT DOCUMENTS

| | | | |
|---|---|---|---|
| 3,966,633 A | 6/1976 | Friedman | 252/373 |
| 3,986,349 A | 10/1976 | Egan | 60/39.02 |
| 4,092,825 A | 6/1978 | Egan | 60/39.02 |
| 4,097,364 A | 6/1978 | Egan | 208/111 |
| 4,170,550 A | 10/1979 | Kamody | 210/23 |
| 4,448,588 A | 5/1984 | Cheng | 48/99 |
| 4,481,015 A | 11/1984 | Lusch et al. | 48/202 |
| 4,597,771 A | 7/1986 | Cheng | 48/77 |
| 4,597,851 A | 7/1986 | Wolowski et al. | 208/400 |
| 5,958,241 A | 9/1999 | DeBenedetto et al. | 210/611 |
| 6,124,066 A1 * | 4/2001 | Nataraj et al. | |
| 6,225,358 B1 * | 5/2001 | Kennedy | |

FOREIGN PATENT DOCUMENTS

| | | | |
|---|---|---|---|
| EP | 0 168 892 A2 | 1/1986 | C01B/3/32 |
| WO | WO 97/05216 | 2/1997 | C10J/3/54 |
| WO | WO 99/13030 | 3/1999 | C10L/1/32 |

* cited by examiner

*Primary Examiner*—Betsey Morrison Hoey

(57) ABSTRACT

The present invention is generally directed to handling the wastewater, or condensate, from a hydrocarbon synthesis reactor. More particularly, the present invention provides a process wherein the wastewater of a hydrocarbon synthesis reactor, such as a Fischer-Tropsch reactor, is sent to a gasifier and subsequently reacted with steam and oxygen at high temperatures and pressures so as to produce synthesis gas. The wastewater may also be recycled back to a slurry preparation stage, where solid combustible organic materials are pulverized and mixed with process water and the wastewater to form a slurry, after which the slurry fed to a gasifier where it is reacted with steam and oxygen at high temperatures and pressures so as to produce synthesis gas.

10 Claims, 1 Drawing Sheet

FISCHER-TROPSCH WASTEWATER UTILIZATION

This application claims benefit of provisional application Ser. No. 60/200,309, filed Apr. 28, 2000.

BACKGROUND OF THE INVENTION

1. Field of the Invention

The present invention is generally directed to the handling of the wastewater product of a hydrocarbon synthesis reactor. More particularly, this process is directed to recycling the wastewater product of a hydrocarbon synthesis reactor located downstream of a gasifier back to the feed of the gasifier.

2. Background

The process and advantages of gasifying hydrocarbonaceous material into synthesis gas are generally known in the industry. In high temperature gasification processes, synthesis gas is commonly produced from solid combustible organic fuels, such as coal, residual petroleum, wood, tar sand, shale oil, and municipal, agriculture or industrial waste. Prior to the gasification step, these solid combustible organic fuels are commonly pulverized and mixed with water to form slurry. The solid combustible organic fuels, in slurry form, are then reacted with a reactive oxygen-containing gas, such as air or oxygen, in a gasification reactor to obtain the synthesis gas.

In the reaction zone of a gasification reactor, the solid combustible organic fuel is contacted with a free-oxygen containing gas, optionally in the presence of a temperature moderator such as stearn. In the reaction zone, the contents will commonly reach temperatures in the range of about 1,700° F. (930° C.) to about 3,000° F. (1650° C.), and more typically in the range of about 2,000° F. (1100° C.) to about 2,800° F. (1540° C.). Pressure will typically be in the range of about 1 atmosphere (100 KPa) to about 250 atmospheres (25,000 KPa), and more typically in the range of about 15 atmospheres (1500 Kpa) to about 150 atmospheres (1500 KPa).

In a typical gasification process, the synthesis gas will substantially comprise hydrogen, carbon monoxide, and lessor quantities of impurities, such as water, carbon dioxide, hydrogen sulfide, carbonyl sulfide, ammonia, and nitrogen. The synthesis gas is commonly treated to remove or significantly reduce the quantity of impurities before being utilized in a downstream process.

Perhaps the best known of such processes is the Fischer-Tropsch process which involves the catalytic hydrogenation of carbon monoxide to produce a variety of products ranging in size and functionality from methane to higher molecular weight compounds. The main product stream of a Fischer-Tropsch reaction or other hydrocarbon synthesis process will in general contain hydrocarbons, alcohols, other oxygenated hydrocarbons, and a wastewater product, or condensate. This condensate will typically comprise water and hydrocarbons, alcohols, other oxygenates as their solubility limits allow; water being the predominate component. The desired hydrocarbon product generally can be separated from the remaining liquid phase or condensate by means known in the art. The separation is usually not totally complete, though, and often the condensate will have present in it some of the lower molecular weight hydrocarbons and oxygenates in the liquid phase. This contaminated condensate is of little or no commercial value. The oxygenates are known to cause corrosion while the hydrocarbons may cause foaming. Thus, the condensate is normally passed to an expensive water treatment facility where it undergoes typical water treatment steps, such as alcohol stripping, anaerobic digestion and biological oxidation, in order to remove the contaminants from the clean water. This water treatment process involves high capital and operating costs, but in light of existing environmental regulations, the treatment is necessary and thus cannot be avoided.

SUMMARY OF THE INVENTION

The present invention is generally directed to handling the wastewater, or condensate, from a hydrocarbon synthesis reactor. More particularly, the present invention describes sending the wastewater to a gasifier and subsequently reacting it with organic fuel, steam and oxygen at high temperatures and pressures so as to convert the wastewater into synthesis gas.

Also encompassed within the present invention is a process wherein the wastewater of a hydrocarbon synthesis reactor located downstream of a gasifier is recycled back to the gasifier and subsequently reacted with organic fuel, steam and oxygen at high temperatures and pressures so as to convert the wastewater into synthesis gas.

A further aspect of this invention is treating the wastewater from a hydrocarbon synthesis reactor located downstream of a gasifier. The gasifier is located downstream of a solid combustible organic fuel slurry preparation stage. In this embodiment, the wastewater is recycled back to the slurry preparation stage, where the solid combustible organic materials are pulverized and mixed with process water and the wastewater to form slurry. The slurry is then fed to the gasifier where it is reacted with steam and oxygen at high temperatures and pressures so as to convert the wastewater, along with the solid combustible organic fuel, into synthesis gas. The oxygenates in the wastewater provide additional oxygen to the gasifier, and hydrocarbons in the wastewater increase the amount of organic fuel burned in the gasifier to produce syngas. This reduces the overall cost, while eliminating a significant amount of potential environmental liability.

The present invention nearly eliminates the need for fresh water and process water make-up to the slurry preparation step, and a wastewater discharge/treating facility when slurry preparation, gasification, and hydrocarbon synthesis processes are combined as set forth in the following description. These and other features of the present invention are more fully set forth in the following description of illustrative embodiments of the invention.

BRIEF DESCRIPTION OF THE DRAWINGS

The description is presented with reference to the accompanying drawings in which.

DESCRIPTION OF ILLUSTRATIVE EMBODIMENTS

Figure 1:
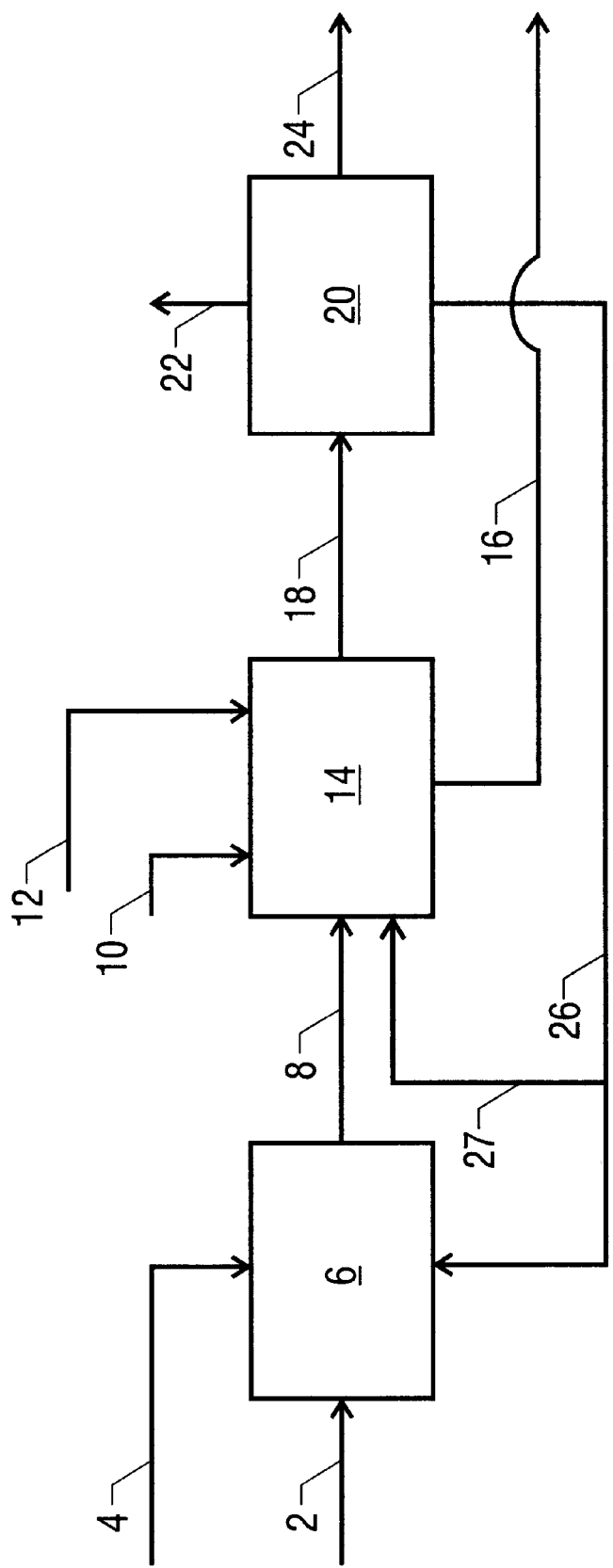
FIG. 1 illustrates an embodiment of the invention in schematic form. It particularly shows the recycle of the Fischer-Tropsch water back to the coal slurry preparation block to form the slurry.

The following terms and phrases are used herein and are intended to have the following meaning:

"Solid combustible organic fuel" is defined as any solid combustible organic material such as coal, residual petroleum, wood, tar sand, shale oil, and municipal, agriculture or industrial waste. The scope of this definition is to include any solid combustible organic fuel that can be used in a gasification process to produce synthesis gas.

"Process water" is defined as any water used to make the slurry other than the wastewater from a hydrocarbon synthesis reactor. The scope of the term "process water" is to include any composition of materials in which water is the predominate component.

"Slurry" is defined as the combination of solid combustible organic fuel and water, where the water is process water or wastewater from a hydrocarbon synthesis reactor. See U.S. Pat. Nos. 4,887,383, 4,722,740, 4,477,259, and 4,242, 098 describing some of the multitude of processes known in the art to produce slurry. The entire disclosures of the above referenced patents are hereby incorporated by reference and relied upon.

"Gasifying" or "gasification" is defined as the process in which various carbonaceous fuels may be converted to synthesis gas by partial oxidation at an elevated reaction temperature and pressure. In the typical gasification process, the carbonaceous fuel is contacted with a free-oxygen containing gas, such as air or oxygen, optionally in the presence of a temperature moderator such as steam. In the reaction zone, the contents will commonly reach temperatures in the range of about 1,700° F. (930° C.) to about 3,000° F. (1650° C.), and more typically in the range of about 2,000° F. (1100° C.) to about 2,800° F. (1540° C). Pressure will typically be in the range of about 1 atmosphere (100 Kpa) to about 250 atmospheres (25,000 KPa), and more typically in the range of about 15 atmospheres (1500 Kpa) to about 150 atmospheres (1500 KPa). See U.S. Pat. No. 3,945,942 describing a partial oxidation burner assembly. See U.S. Pat. No. 5,656,044 describing a method and an apparatus for the gasification of organic materials. See also U.S. Pat. Nos. 5,435,940, 4,851,013, and 4,159,238 describing a few of the many gasification processes known in the prior art. The entire disclosures of the above referenced patents are hereby incorporated by reference and relied upon.

"Synthesis gas" is defined as a gaseous mixture consisting substantially of hydrogen and carbon monoxide, with lessor quantities of impurities present such as water, carbon dioxide, hydrogen sulfide, carbonyl sulfide, ammonia, and nitrogen. It is within the scope of this definition to include any synthesis gas that been treated to remove or reduce the quantity of any of the impurities, so long as the primary components are hydrogen and carbon monoxide.

"Hydrocarbon synthesis catalyst" is defined as a catalyst that converts synthesis gas into hydrocarbon products, such as a Fischer-Tropsch catalyst. Common catalysts are cobalt and iron on an alumina support. Other Group VIII metals such as ruthenium and osmium are also active. Other single metals that have been investigated as catalysts include rhenium, molybdenum, and chromium. The activities of these catalysts are commonly enhanced by the addition of a variety of metals, including copper, cerium, rhenium, manganese, platinum, iridium, rhodium, molybdenum, tungsten, ruthenium or zirconium. Many other metals can be used, and it is within the scope of this invention to include all catalysts that convert synthesis gas in to hydrocarbon products. See U.S. Pat. Nos. 5,780,391, 5,162,284, 5,102, 581, 4,801,573, and 4,686,238 for illustrations of some of the various types of catalyst that can be used to produce hydrocarbons from synthesis gas. The entire disclosures of the above referenced patents are hereby incorporated by reference and relied upon.

"Wastewater" or "wastewater from a hydrocarbon synthesis reactor" is defined as the condensate, or water portion, of a hydrocarbon synthesis reactor product stream. This wastewater will typically comprise water as the predominate component, and other watersoluble compounds produced in the hydrocarbon synthesis reactor such as hydrocarbons, alcohols, carboxylic acids, and other oxygenates as dictated by their individual solubility limits.

Herein, "reaction products" is defined as any product of a hydrocarbon synthesis reactor not including the wastewater. Typical products of the Fischer-Tropsch reaction include hydrocarbons from $C_1$ to $C_{200}$ or higher, with the bulk of the hydrocarbons produced being in the $C_1$ to $C_{50}$ range. Typically, from 40 to 80% of the hydrocarbons produced are straight-chain olefins and paraffins. The Fischer-Tropsch reaction also produces varying amounts of carbon dioxide and oxygenated components, including acids such as acetic acid, formic acid, propionic acid; alcohols such as methyl, ethyl, propyl and higher alcohols; aldehydes, ketones and esters. Typically, these oxygenated components comprise 1 to 20 weight percent of the Fischer-Tropsch reaction product and because of their water soluble nature may be found in the wastewater.

In one embodiment of the present invention, wastewater from a hydrocarbon synthesis reactor is sent to a gasification reactor to be converted to synthesis gas. By doing so, many process and economic advantages may be realized. First, and perhaps most importantly, the wastewater can be disposed of with no adverse environmental affects. The present invention offers a solution to wastewater, providing a hydrocarbon synthesis process with total internal water recycle. The large capital and operating costs associated with traditional water treatment facilities may be drastically reduced, if not eliminated. In addition the oxygenates in the wastewater may also reduce the oxygen requirement of the gasifier, thus reducing the gasifier operating costs as well.

A second embodiment of this invention is recycling the wastewater from a hydrocarbon synthesis reactor back to the slurry preparation stage, where solid combustible organic fuel such as coal, residual petroleum, wood, tar sand, shale oil, and municipal, agriculture or industrial waste, are pulverized and mixed with water to form a slurry. The slurry is then fed to the gasifier where it is reacted with steam and oxygen at high temperatures and pressures. In addition to the environmental, water treatment capital and operating cost savings, and gasifier operating costs savings discussed earlier, this embodiment may also reduce the process water requirement of the slurry preparation stage. Thus, the costs associated with preparing solid carbonaceous material for gasification may be also reduced.

An illustration of the second embodiment of the invention is shown in the drawing FIG. 1. The numbers in this description refer to the numbers on the drawing FIG. 1. The following embodiment references coal as a solid organic fuel, but the overall concept of the invention is applicable to other solid organic fuels such as residual petroleum or wood, tar sand, shale oil, municipal, agricultural, and industrial waste, and other solid organic fuels known in the art.

Solid coal is fed to the coal slurry preparation device 6 through line 2. Coal slurry preparation device 6 is any process known to the art that finely pulverizes coal and disperses the resultant fine coal particles in an aqueous medium to provide an aqueous coal slurry 8. In the present embodiment, the aqueous medium is water in the form of process water supplied in line 4 and/or Fischer-Tropsch wastewater supplied in line 26. The aqueous coal slurry 8 is then fed to the gasifier 14.

In gasifier 14, coal slurry 8 is reacted with oxygen 10 and steam 12 at high temperature and pressure so as to partially oxidize the feed in to synthesis gas 18. Acid gas 16, comprising carbon dioxide ($CO_2$) hydrogen sulfide ($H_2S$) is removed from the synthesis gas 18 by gas purification and processing systems known in the art. This is done because the efficiency of the subsequent Fischer-Tropsch reactor 20 can be improved if the raw synthesis gas is purified by the removal of impurities, such as carbon dioxide and hydrogen sulfide, and a relatively clean mixture of hydrogen and carbon monoxide is provided to the reactor.

Synthesis gas 18 is then sent to the Fischer-Tropsch reactor 20, where it is converted in to tailgas 22, Fischer-Tropsch liquids 24, and Fischer-Tropsch wastewater 26. The Fischer-Tropsch liquids 24 and Fischer-Tropsch wastewater 26 generally contain $C_5$+hydrocarbons, water, oxygenated compounds and small amounts of dissolved tailgas. The Fischer-Tropsch liquids 24 and the Fischer-Tropsch wastewater 26 are then separated from each other by any means known in the art, such as cooling and liquid phase separation, to separate hydrocarbons from water. The Fischer-Tropsch wastewater 26 typically comprises water and hydrocarbons, alcohols, other oxygenates as their solubility limits allow; water being the predominate component. The tailgas 22 and the Fischer-21 Tropsch liquids 24 together contain the "reaction products" as defined above, and are used, stored, or further processed in methods outside the scope of the present invention.

The Fischer-Tropsch wastewater is then recycled back to coal slurry preparation device 6 to be mixed with solid coal 2 and process water 4 to form slurry 8. One additional alternative to recycling the Fischer-Tropsch wastewater to the slurry preparation stage is to recycle all or part of the wastewater directly to the gasifier, as shown by stream 27. Recycling the wastewater directly to the gasifier may require a costly high head pump and major modifications to the gasifier feed injector nozzle to accommodate the additional liquid stream. After looking at each case, one of skill in the art should recognize that the preferred embodiment of the present invention involves recycling the wastewater to the slurry preparation step.

In view of the preceding, one of ordinary skill in the art should understand and appreciate that in one illustrative embodiment of the present invention is to gasify the wastewater from a hydrocarbon synthesis reactor. This can involve recycling the wastewater to a gasifier located upstream of the hydrocarbon synthesis reactor, or can involve sending the wastewater to a gasifier not connected to the hydrocarbon synthesis reactor.

Another embodiment of the present invention is to use the wastewater in the production of slurry feed for a gasification reactor. This would involve mixing the wastewater with solid combustible organic fuel and process water, if necessary, to form the slurry and then processing the slurry in a gasification reactor.

A further embodiment of the present invention is an improved hydrocarbon synthesis process. This process involves mixing a solid combustible organic fuel with wastewater and process water, if necessary, to form a slurry. The slurry is then converted into synthesis gas by reacting the slurry with steam and oxygen at an elevated temperature in a gasification reactor. The synthesis gas is then contacted with a hydrocarbon synthesis catalyst to form reaction products and wastewater. The wastewater is separated from the reaction products and recycled back to be mixed with the solid combustible organic fuel and the process water to form the slurry.

Other illustrative embodiments of the present invention are a feed composition for a gasification reactor and the method of mixing the components to obtain the feed composition. This composition comprises solid combustible organic fuel and wastewater. This composition may also include process water, if necessary.

While the devices, compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for treating wastewater from a hydrocarbon synthesis reactor comprising:
    (a) mixing the wastewater with a solid combustible organic fuel to form a slurry; and
    (b) gasifying the slurry in a gasifier to produce synthesis gas.

2. The method of claim 1 further comprising mixing process water with the wastewater and the solid combustible organic fuel.

3. The method of claim 1 further comprising sending a portion of the wastewater directly to the gasifier.

4. A hydrocarbon synthesis process comprising:
    (a) mixing a solid combustible organic fuel with a wastewater to form a slurry;
    (b) forming a synthesis gas by gasifying the slurry in a gasifier;
    (c) contacting the synthesis gas with a hydrocarbon synthesis catalyst to form reaction products and the wastewater;
    (d) separating the wastewater from the reaction products; and
    (e) recycling the wastewater back to be mixed with the combustible organic fuel to form the slurry.

5. The process of claim 4 further comprising mixing process water with the wastewater and the solid combustible organic fuel to form the slurry.

6. The process of claim 4 further comprising sending a portion of the wastewater directly to the gasifier.

7. A feed composition for a gasifier in the form of a slurry comprising solid combustible organic fuel and wastewater from a hydrocarbon synthesis reactor.

8. The composition of claim 7 further comprising process water.

9. A method of preparing a feed for a gasifier in the form of a slurry comprising mixing solid combustible organic fuel with wastewater from a hydrocarbon synthesis reactor.

10. The method of claim 9 further comprising mixing process water with the solid combustible organic fuel and the wastewater.

* * * * *